(12) United States Patent
Koizumi et al.

(10) Patent No.: US 10,403,308 B2
(45) Date of Patent: Sep. 3, 2019

(54) MAGNETIC DISK DEVICE WHICH CONTROLS A RECORDING OPERATION AND A NON-RECORDING OPERATION OF A RECORDING HEAD AND A RECORDING HEAD CONTROL METHOD OF THE MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Gaku Koizumi, Kanagawa (JP); Akihiko Takeo, Tokyo (JP); Naoyuki Narita, Kanagawa (JP); Masaya Ohtake, Kanagawa (JP); Yusuke Tomoda, Kanagawa (JP); Tomoyuki Maeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/896,281

(22) Filed: Feb. 14, 2018

(65) Prior Publication Data
US 2019/0051322 A1 Feb. 14, 2019

(30) Foreign Application Priority Data

Aug. 10, 2017 (JP) .................................. 2017-155685

(51) Int. Cl.
*G11B 5/31* (2006.01)
*G11B 5/012* (2006.01)
(Continued)

(52) U.S. Cl.
CPC ............ *G11B 5/1278* (2013.01); *G11B 5/012* (2013.01); *G11B 5/3143* (2013.01); *G11B 5/315* (2013.01);
(Continued)

(58) Field of Classification Search
None
See application file for complete search history.

(56) References Cited

U.S. PATENT DOCUMENTS

2004/0080876 A1 4/2004 Sugita et al.
2011/0116193 A1 5/2011 Gubbins et al.
(Continued)

FOREIGN PATENT DOCUMENTS

JP 2012-014792 A 1/2012
JP 2014-086122 A 5/2014

*Primary Examiner* — Craig A. Renner
(74) *Attorney, Agent, or Firm* — White & Case LLP (57) ABSTRACT

According to one embodiment, a magnetic disk device conforming to perpendicular magnetic recording includes a magnetic disk, a recording head, and a controller. The head includes a main magnetic pole, a return magnetic pole, a recording coil, and a conductive member in which end surfaces are connected to opposed surfaces of a write gap which is opposed to a distal portion of the main magnetic pole and a distal portion of the return magnetic pole, and a resistance value varies. The controller applies a current to the recording coil to excite the magnetic flux in the recording operation, and applies a current at a constant voltage to the magnetic circuit via the comductive member.

8 Claims, 12 Drawing Sheets

(51) Int. Cl.
  *G11B 5/127* (2006.01)
  *G11B 5/39* (2006.01)
  *G11B 5/00* (2006.01)

(52) U.S. Cl.
  CPC .... *G11B 5/3967* (2013.01); *G11B 2005/0024* (2013.01)

(56) References Cited

U.S. PATENT DOCUMENTS

| | | | |
|---|---|---|---|
| 2013/0050865 A1* | 2/2013 | Katada et al. | G11B 5/1278 360/31 |
| 2013/0188275 A1 | 7/2013 | Isokawa et al. | |
| 2014/0118861 A1 | 5/2014 | Funayama | |
| 2015/0103442 A1 | 4/2015 | Gubbins et al. | |
| 2017/0148471 A1* | 5/2017 | Tabata et al. | G11B 5/1278 |

* cited by examiner

MAGNETIC DISK DEVICE WHICH CONTROLS A RECORDING OPERATION AND A NON-RECORDING OPERATION OF A RECORDING HEAD AND A RECORDING HEAD CONTROL METHOD OF THE MAGNETIC DISK DEVICE

CROSS-REFERENCE TO RELATED APPLICATIONS

This application is based upon and claims the benefit of priority from Japanese Patent Application No. 2017-155685, filed Aug. 10, 2017, the entire contents of which are incorporated herein by reference.

FIELD

Embodiments described herein relate generally to a magnetic disk device using a perpendicular magnetic recording head and a recording head control method.

BACKGROUND

Recently, to realize high recording density, large capacity and miniaturization, magnetic disk devices have been adopted perpendicular magnetic recording methods. In a magnetic disk device adopting this method, a recording head conforming to perpendicular magnetic recording is opposed to a recording surface of a magnetic disk having a recording layer conforming to perpendicular magnetic recording, and data is recorded in a predetermined region of the magnetic disk by generating a perpendicular magnetic field corresponding to the recording data by the recording head.

Here, the recording head conforming to perpendicular magnetic recoding includes a main magnetic pole which has a narrowing portion formed of a soft magnetic material, a return magnetic pole which returns a magnetic flux from the main magnetic pole and forms a magnetic circuit in cooperation with the main magnetic pole, and a coil which excites a magnetic flux and generates a recording magnetic field in the magnetic circuit formed of the main magnetic pole and the return magnetic pole.

In the case of the recording head having the above-described structure, in a recording state, a projection is formed locally in a gap between the main magnetic pole and the return magnetic pole, and this projection may frequently contacts an abnormal projection of a recording medium. In particular, if a recording current has a high value, a diamond-like carbon (DCL) component tends to be worn or deposited on an air bearing surface (ABS) of the recording head, and the reliability has been suspected.

Embodiment aims to provide a magnetic disk device and a recording head control method which can prevent local projection formed in a gap between a main magnetic pole and a return magnetic pole during recording to the magnetic disk.

DETAILED DESCRIPTION

Embodiments will be described hereinafter with reference to the accompanying drawings.

In general, according to one embodiment, a magnetic disk device includes a magnetic disk having a recording layer conforming to perpendicular magnetic recording, a recording head which generates a perpendicular recording magnetic field to be applied to the recording layer, and a controller which controls a recording operation and a non-recording operation of the recording head. The recording head includes a main magnetic pole which generates the perpendicular recording magnetic field, a return magnetic pole which returns a magnetic flux from the main magnetic pole forms a magnetic circuit in cooperation with the main magnetic pole, a recording coil which excites the magnetic flux in the magnetic circuit formed of the main magnetic pole and the return magnetic pole, and a conductive member in which end surfaces are connected to opposed surfaces of a write gap which is opposed to a distal portion of the main magnetic pole and a distal portion of the return magnetic pole, and a resistance value varies between a recording operation and a non-recording operation. The controller includes a constant voltage supply source which applies a current at a constant voltage to the magnetic circuit formed in the main magnetic pole and the return magnetic pole via the conductive member, and a current supply source which applies a current to the recording coil to excite the magnetic flux in the recording operation.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Figure 1:
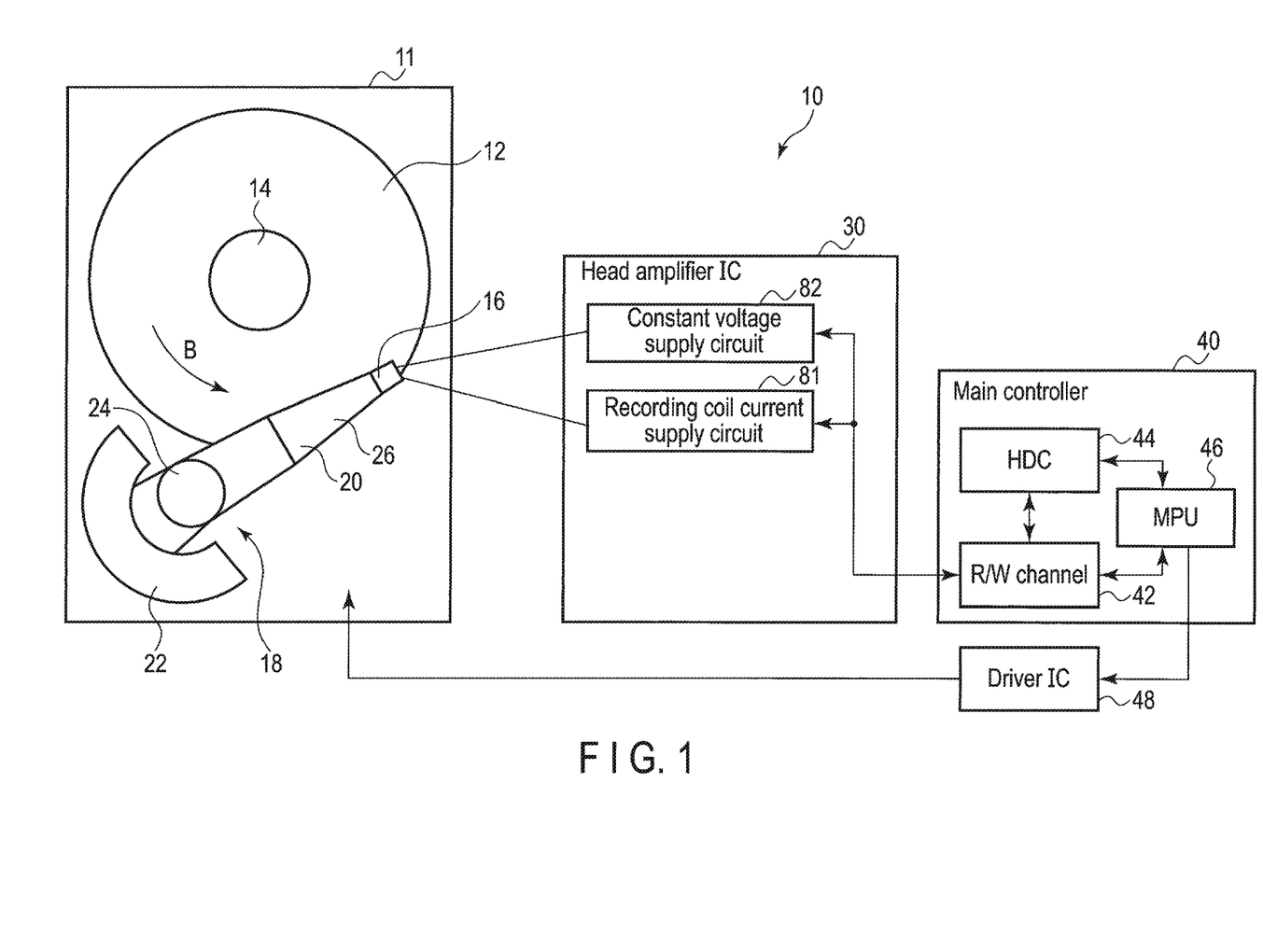
FIG. 1 is a block diagram schematically showing a magnetic disk device (HDD) according to the embodiment.
Figure 2:
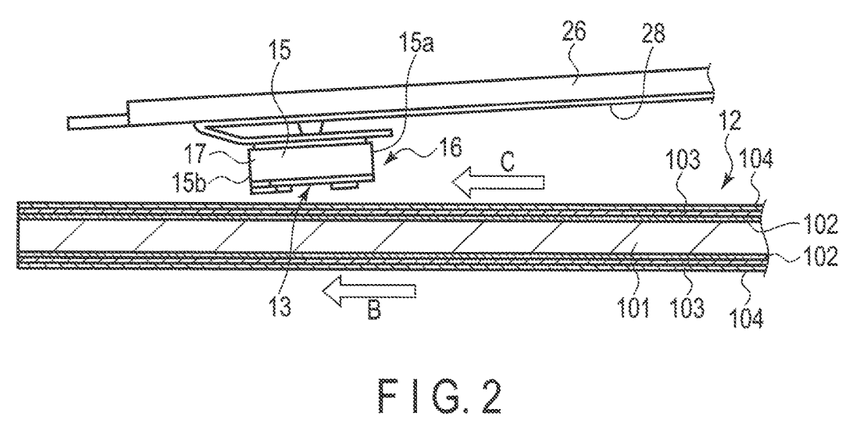
FIG. 2 is a side view showing a magnetic head, a suspension and a recording medium in the HOD.

FIG. 1 is a block diagram schematically showing a hard disk drive (HOD) as a magnetic disk device according to the embodiment, and FIG. 2 is a side view showing a magnetic head in a flying state and a magnetic disk.

As shown in FIG. 1, the HDD 10 includes a rectangular housing 11, a magnetic disk 12 as a recording medium arranged in the housing 11, a spindle motor 14 which supports and rotates the magnetic disk 12, and a plurality of magnetic heads 16 which writes data on and reads data from the magnetic disk 12. Further, the HDD 10 includes a head actuator 18 which moves and positions the magnetic heads 16 above an arbitrary track on the magnetic disk 12. The head actuator 18 includes a suspension assembly 20 which movably supports the magnetic heads 16, and a voice coil motor (VCM) 22 which rotates the suspension assembly 20.

The HDD 10 includes a head amplifier IC 30, a main controller 40 and a driver IC 48. The head amplifier IC 30 is provided in the suspension assembly 20, for example, and is electrically connected to the magnetic heads 16. The main controller 40 and the driver IC 48 are formed on a control circuit board (not shown) provided on the back surface side of the housing 11, for example. The main controller 40 includes an R/W channel 42, a hard disk controller (HDC) 44, a microprocessor (MPU) 46. The main controller 40 is electrically connected to the head amplifier IC 30 and is electrically connected to the VCM 22 and the spindle motor 14 via the driver IC 48. The HDD 10 is connectable to a host computer (not shown).

As shown in FIGS. 1 and 2, the magnetic disk 12 is a perpendicular magnetic recording medium having a recording layer having an anisotropy in a direction perpendicular to a disk surface. More specifically, the magnetic disk 12 has a substrate 101 having the shape of a circular plate having a diameter of about 2.5 inches (6.35 cm) and formed of a non-magnetic material. A soft magnetic layer 102 as an underlayer, and a magnetic recording layer 103 and a protection film 104 as upper layers are stacked in series on each surface of the substrate 101. The magnetic disk 12 is coaxially engaged with a hub of the spindle motor 14. The magnetic disk 12 is rotated by the spindle motor 14 at a predetermined speed in the direction of an arrow B.

The suspension assembly 20 has a bearing portion 24 rotatably fixed to the housing 11 and a plurality of suspensions 26 extending from the bearing portion 24. As shown in FIG. 2, the magnetic heads 16 are supported on the extended ends of the suspensions 26. The magnetic heads 16 are electrically connected to the head amplifier IC 30 via wiring members 28 provided in the suspension assembly 20.

Figure 3:
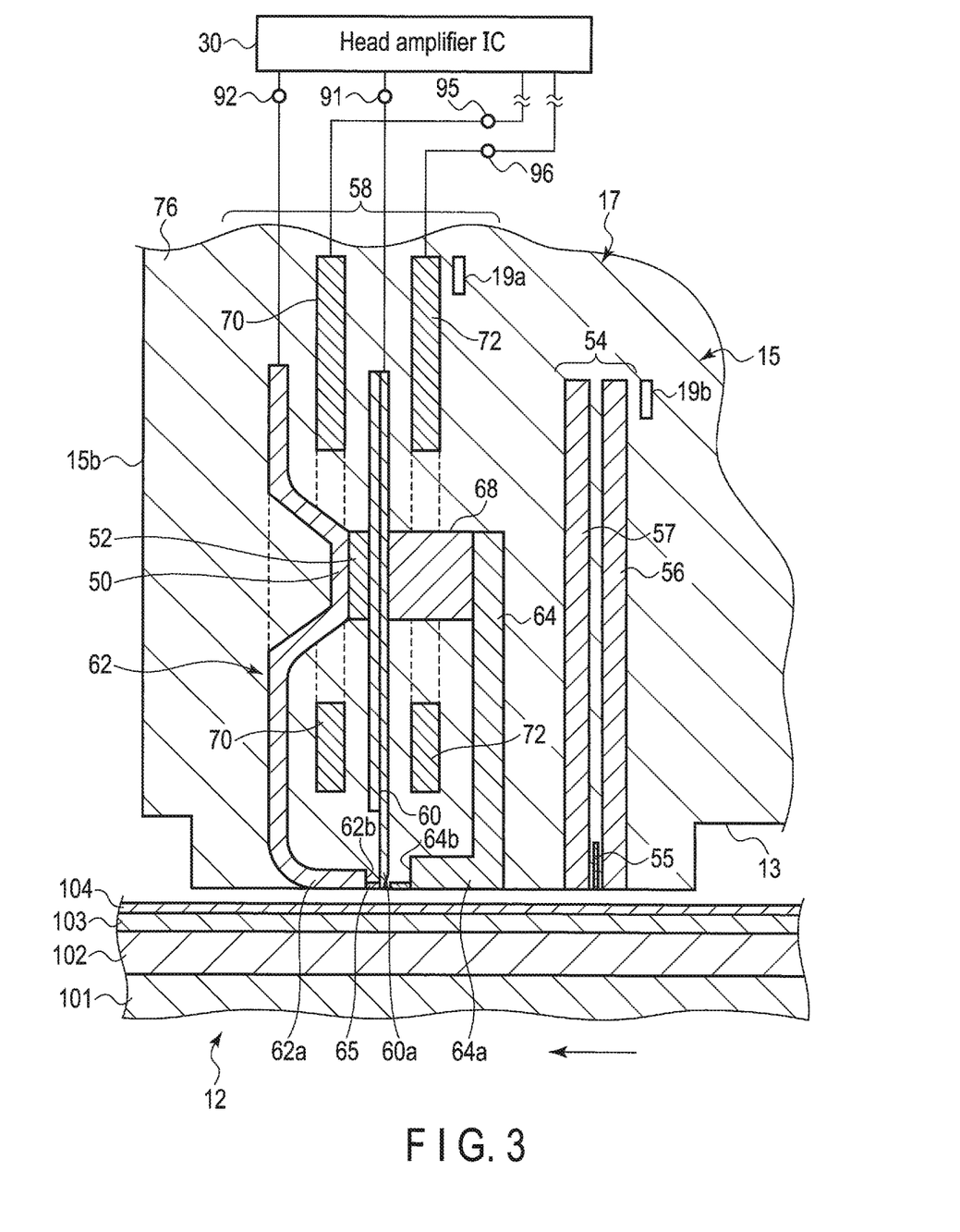
FIG. 3 is an enlarged sectional diagram schematically showing a head portion of the magnetic head and part of the magnetic disk in the embodiment.
Figure 4:
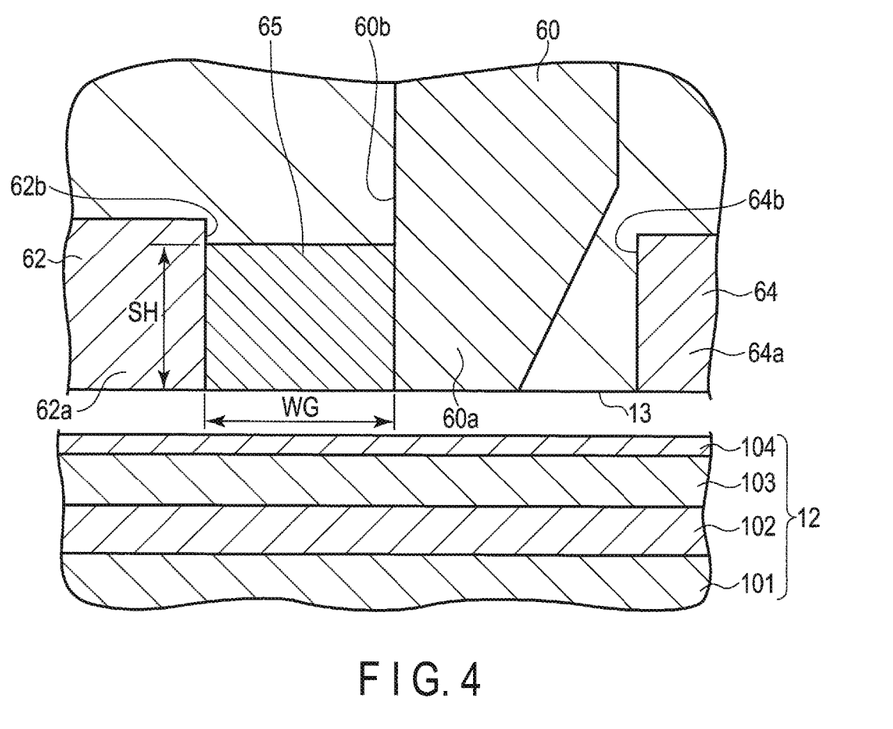
FIG. 4 is an enlarged sectional diagram showing a distal portion of a recording head and part of the magnetic disk in the embodiment.
Figure 5:
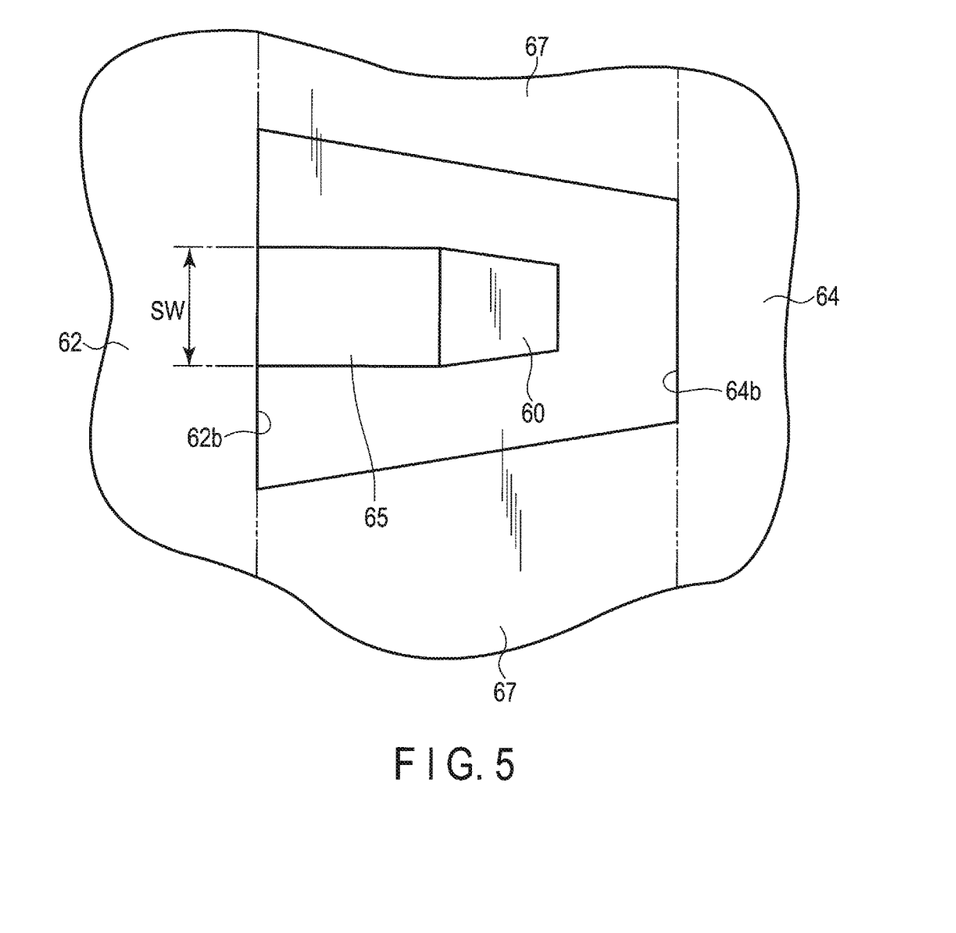
FIG. 5 is an enlarged plan view showing the distal portion of the recording head when viewed from the air bearing surface side.

Next, the structure of the magnetic heads 16 will be described. FIG. 3 is an enlarged sectional diagram showing a head portion of the magnetic head and part of the magnetic disk, FIG. 4 is an enlarged sectional diagram showing a distal portion of a recording head and part of the magnetic disk, and FIG. 5 is an enlarged plan view showing the distal portion of the recording head when viewed from the ABS side.

As shown in FIGS. 2 and 3, the magnetic head 16 is formed as a flying type head, and has a slider 15 having a substantially rectangular parallelpiped shape and a head portion 17 formed at an outflow (trailing) side end of the slider 15. The slider 15 is formed of sintered alumina and titanium carbide (AlTiC), for example, and the head portion 17 is formed of a plurality of thin films.

The slider 15 has a rectangular air bearing surface (ABS) 13 opposed to the surface of the magnetic disk 12. The slider 15 is maintained to be flying at a predetermined height form the surface of the magnetic by an airflow C which is produced between the disk surface and the ABS 13 by the rotation of the magnetic disk 12. The direction of the airflow C coincides with a rotation direction B of the magnetic disk 12. The slider 15 has a leading end 15a located on an inflow side in the airflow C and a trailing end 15b located on an outflow side in the airflow C.

As shown in FIG. 3, the head portion 17 is a separate type magnetic head in which a reproducing head 54 and a recording head 58 are formed at the trailing end 15b of the slider 15 by a thin-film process. To control the recording-and-reproducing flying height of the head portion 17, a first heater 19a is provided on a depth side of the recording head 58, and a second heater 19b is provided on a depth side of the reproducing head 54.

The reproducing head 54 includes a reproducing element 55, which is formed of a magnetic film and produces a magnetoresistive effect, and an upper shield 56 and a lower shield 57, which are shielding films arranged respectively on the trailing side and leading side of the reproducing element 55 such that the magnetic film 55 is sandwiched between the shielding films. The lower ends of the reproducing element 55, the upper shield 56 and the lower shield 57 are exposed on the ABS 13 of the slider 15. The reproducing head 54 is connected to the head amplifier IC 30 via an electrode, a wire and the wiring member 28 (not shown), and outputs read data to the head amplifier IC 30.

The recording head 58 is provided on the trailing end 15b side of the slider 15 from the reproducing head 54. The recording head 58 includes a main magnetic pole 60 which is formed of a material having high magnetic permeability and produces a recording magnetic field in a direction perpendicular to the surface of the magnetic disk 12, a return magnetic pole 62 which serves as a trailing shield (a write shield, a first shield), and a leading core 64 which serves as a leading shield (a second shield). The main magnetic pole 60 and the returning magnetic pole 62 constitute a first magnetic core which forms a magnetic path, and the main magnetic pole 60 and the reading core 64 constitute a second magnetic core which forms a magnetic path. The recording head 58 includes a first coil (recording coil) 70 wound around the first magnetic core, and a second coil (recording coil) 72 wound around the second magnetic core.

As shown in FIGS. 3 and 4, the main magnetic pole 60 extends substantially perpendicularly to the surface of the magnetic disk 12. A distal portion 60a of main magnetic pole 60 on the magnetic disk 12 side tapers down toward the disk surface and has a trapezoidal cross-section, for example. A distal end surface of the main magnetic pole 60 is exposed on the ABS 13 of the slider 15. The width of a trailing side end surface 60*b* of the distal portion 60*a* substantially corresponds to the width of each track in the magnetic disk 12.

The return magnetic pole 62 formed of a soft magnetic material is arranged on the trailing side of the main magnetic pole 60 and is provided for effectively closing the magnetic path via the soft magnetic layer 102 of the magnetic disk 12 provided directly under the main magnetic pole 60. The return magnetic pole 62 has substantially the shape of a letter L and has a first connecting portion 50 connected to the main magnetic pole 60. The first connecting portion 50 is connected to an upper portion of the main magnetic pole 60, that is, a portion of the main magnetic pole 60 located away from the ABS 13, via a non-conductive member 52.

A distal portion 62*a* of the return magnetic pole 62 has the shape of a long thin rectangle. A distal end surface of the return magnetic pole 62 is exposed on the ABS 13 of the slider 15. A leading side end surface 62*b* of the distal portion 62*a* extends in the width direction of each track of the magnetic disk 12 and also extends substantially perpendicularly to the ABS 13. The leading side end surface 62*b* is opposed substantially parallel to the trailing side end surface 60*b* of the main magnetic pole 60 via a write gap WG.

The first coil 70 is arranged in such a manner as to wind around a magnetic circuit (the first magnetic core) including the main magnetic pole 60 and the return magnetic pole 62. The first coil 70 is wound around the first connecting portion 50, for example. When a signal is to be written on the magnetic disk 12, a recording current is applied to the first coil 70, and the first coil 70 excites the main magnetic pole 60 and applies a magnetic flux to the magnetic pole 60.

As shown in FIGS. 4 and 5, a conductive member 65, which is formed of a magnetoresistive effect film in which a magnetic resistance changes when a current is applied, is arranged in the write gap WG such that the conductive member 65 is sandwiched between the trailing side end 60*b* of the distal portion 60*a* of the main magnetic pole 60 and the leading side end 62*b* of the return magnetic pole 62. A lower end surface of the conductive member 65 is exposed on the ABS 13 and is flush with the ABS 13. A width SW of the conductive member 65 is less than or substantially equal to a track width of the magnetic recording layer 103. A height SH (height in a direction perpendicular to the ABS 13) of the conductive member 65 is less than or substantially equal to the height of the leading side end surface 62*b* of the return magnetic pole 62. The lower end surface of the conductive member 65 is not necessarily flush with the ABS 13 but may be upwardly away from the ABS 13 in the height direction.

As shown in FIG. 3, the main magnetic pole 60 and the return magnetic pole 62 are connected respectively to connecting terminals 91 and 92, and the connecting terminals 91 and 92 are connected to the head amplifier IC 30 via wires. In this way, a current circuit is constituted such that a current can be applied from the head amplifier IC 30 through the main magnetic pole 60, the conductive member 65 and the return magnetic pole 62 in series.

As shown in FIGS. 3 and 4, the leading core 64 formed of a soft magnetic material is provided on the leading side of the main magnetic pole 60 and is opposed to the main magnetic pole 60. The leading core 64 has substantially the shape of a letter L, and a distal portion 64*a* on the magnetic disk 12 side has the shape of a long thin rectangle. The distal end surface (lower end surface) of the distal portion 64*a* is exposed on the ABS 13 of the slider 15. A trailing side end surface 64*b* of the distal portion 64*a* extends in the width direction of each track of the magnetic disk 12. The trailing side end surface 64*b* is opposed to the leading side end surface of the main magnetic pole 60 via a gap. The gap is covered with a protective insulating film 76 as a non-magnetic member.

The leading core 64 has a second connecting portion 68 connected in a back gap between the leading core 64 and the main magnetic pole 60 in a location away from the magnetic disk 12. The second connecting portion 68 is formed of a soft magnetic material, for example, and forms a magnetic circuit in cooperation with the main magnetic pole 60 and the leading core 64. The second coil 72 of the recording head 58 is arranged in such a manner as to wind around the magnetic circuit (the second magnetic core) including the main magnetic pole 60 and the leading core 64 and applies a magnetic field to the magnetic circuit. The second coil 72 is wound around the second connecting portion 68, for example. Note that a non-conductive member or a non-magnetic member may be interposed in part of the second connecting portion 68. The winding direction of the second coil 72 is opposite to the winding direction of the first coil 70. The first coil 70 and the second coil 72 are connected respectively to terminals 95 and 96, and the terminals 95 and 96 are connected to the head amplifier IC 30 via wires. The second coil 72 may be serially connected to the first coil 70. Further, current application may be separately controlled in the first coil 70 and the second coil 72. The current to be applied to the first coil 70 and the second coil 72 is controlled by the head amplifier IC 30 and the main controller 40.

As shown in FIG. 5, the recording head 58 further includes a pair of side shields 67 arranged on both sides of the main magnetic pole 60 in the width direction via gaps. In the present embodiment, the side shields 67 are integrally formed with the return magnetic pole 62 and the leading core 64, and surround the distal portion 60*a* of the main magnetic pole 60 and the write gap WG.

In the recording head 58, the soft magnetic material used for the main magnetic pole 60, the return magnetic pole 62, the leading core 64 and the side shields 67 can be selected from alloys or compounds containing at least one of Fe, Co and Ni.

As shown in FIG. 3, the reproducing head 54 and the recording head 58 are covered with the protective insulating film 76 except for portions exposed on the ABS 13 of the slider 15. The protective insulating film 76 forms the external shape of the head portion 17.

The head amplifier IC 30 which drives the magnetic head 16 and the recording head 58 structured as described above includes a recording current supply circuit 81 which applies a recording current to the first coil 70 and the second coil 72 via the terminals 95 and 96, and a constant voltage supply circuit 82 which applies a constant voltage and applies a current to a straight path of the main magnetic pole 60, the conductive member 65 and the return magnetic pole 62 via wires (not shown) and the terminals 91 and 92, as shown in FIG. 1, and further includes a timing calculator (not shown) which controls time and timing for applying current to the recording current supply circuit 81 and the constant voltage supply circuit 82, and a recording current waveform generator (not shown) which generates a recording current waveform in accordance with a recording pattern signal generated in the R/W channel 42.

When the HDD 10 is in operation, the main controller 40 causes the driver IC 48 to drive the spindle motor 14 under the control of the MPU 46, and rotates the magnetic disk 12 at a predetermined speed. Further, the main controller 40 causes the driver IC 48 to drive the VCM 22, and moves and positions the magnetic heads 16 above a desired track of the magnetic disk 12.

In a recording state, the recording coil current supply circuit 81 of the head amplifier IC 30 applies recording coil current (AC) to the first and second coils (hereinafter referred to as recording coils) 70 and 72 in accordance with a recording signal and a recording pattern from the R/W channel 42. In this way, the first and second coils 70 and 72 excite the main magnetic pole 60 and cause the main magnetic pole 60 to generate a recording magnetic field. The constant voltage supply circuit 82 applies a constant voltage to the main magnetic pole 60 and the return magnetic pole 62 under the control of the MPU 46, and serially applies a drive current through the wires, the connecting terminals 91 and 92, the main magnetic pole 60, the conductive member 65 and the return magnetic pole 62.

The operation of the magnetic disk device having the above-described structure will be described below.

Figure 6:
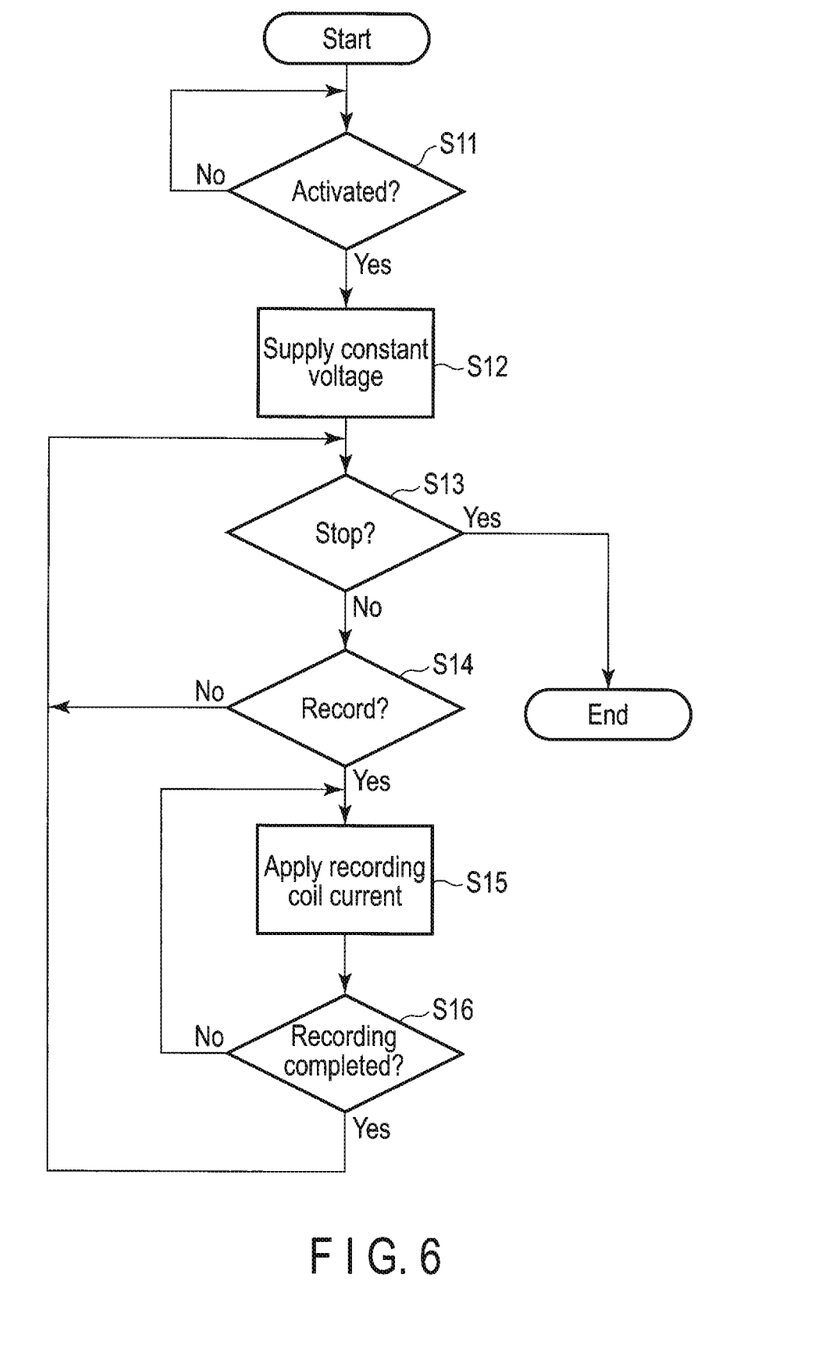
FIG. 6 is a flowchart showing a recording head control method of the magnetic disk device according to the embodiment.

FIG. 6 is a flowchart showing a recording head control method of the HDD 10 according to the present embodiment. Firstly, when receiving an instruction to activate the HDD (step S11), the main controller 40 instructs the head amplifier IC 30 to supply a constant voltage to the magnetic head 16 (step S12). Here, the main controller 40 checks the presence or absence of a stop instruction (step S13), waits for a recording instruction if not receiving any stop instruction (step S14), and instructs the head amplifier IC 30 to apply a recording coil current to the recording coils 70 and 72 in accordance with a recording pattern if receiving a recording instruction (step S15). If it is confirmed that recording is completed (step S16), the processing returns to step S13 and the series of recording processing is repeated until a stop instruction is given.

Figure 7A:
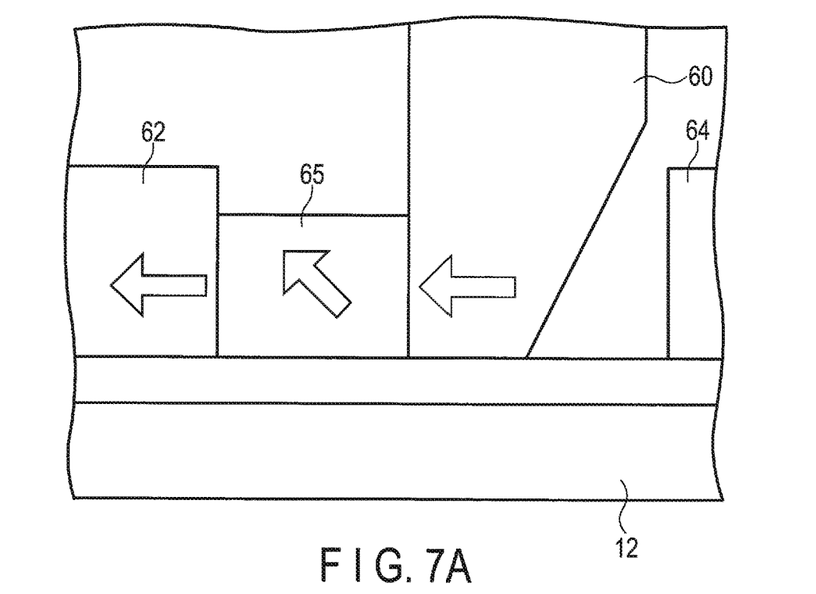
FIGS. 7A and 7B are schematic diagrams respectively showing a magnetization state in (a write operation) and a magnetization state in a non-recording state (a read operation) in the vicinity of a write gap WG in the present embodiment.
Figure 7B:
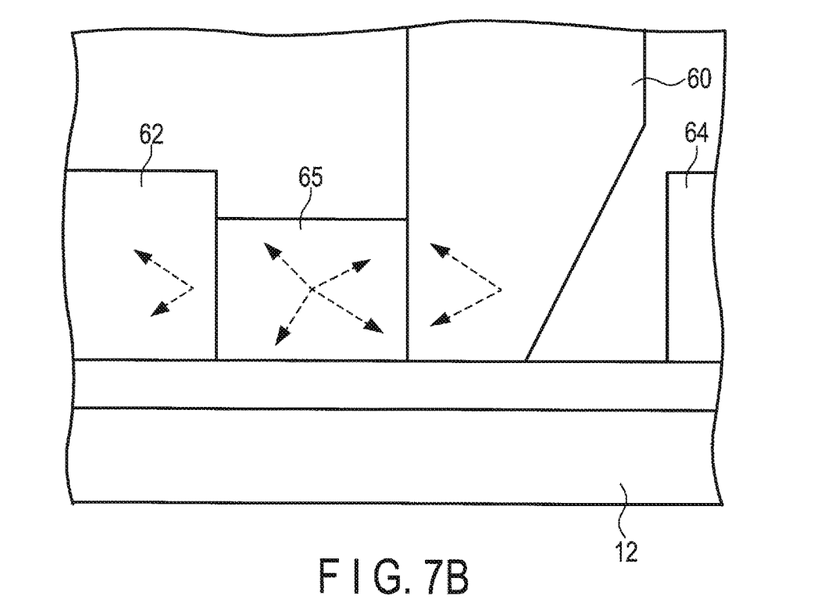

FIGS. 7A and 7B are schematic diagram respectively showing a magnetization state in a recording state (a write operation) and a magnetization state in a non-recording state (a read operation) in the vicinity of the write gap WG in the present embodiment.

In a recording state, the magnetizations of the main magnetic pole 60 and the return magnetic pole 62 are substantially in the state of saturation, and therefore the magnetization of the conductive member 65 is angled with respect to the direction of a magnetic flux from the main magnetic pole 60 by spin torque from the magnetization of the main magnetic pole 60 or the return magnetic pole 62 as shown in FIG. 7A. As a result, a writer resistance value at a time when a current is applied through the main pole 60, the conductive member 65 and the return magnetic pole 62 is increased by a magnetoresistive effect between the main magnetic pole 60 or the return magnetic pole 62 and the conductive member 65.

In a demagnetized non-recording state, on the other hand, the magnetizations of the main magnetic pole 60 and the return magnetic pole 62 are in disorder, and therefore the spin torque associated with the combination of the conductive member 65 and the main magnetic pole 60 or the return magnetic pole 62 is not produced, and the magnetization of the conductive member 65 remains in disorder as shown in FIG. 7B. As a result, since the magnetoresistive effect is not produced between the main magnetic pole 60 or the return magnetic pole 62 and the conductive member 65, the writer resistance value at a time when a current is applied through the main magnetic pole 60, the conductive member 65 and the return magnetic pole 62 will not be increased.

From the above, according to the structure of the present embodiment, the writer resistance value varies between the recording state and the non-recording state, and therefore element projection in the vicinity of the write gap WG can be locally controlled by using the change of the writer resistance value.

Next, an element projection correction method using the change of the writer resistance value will be described.

Figure 8A:
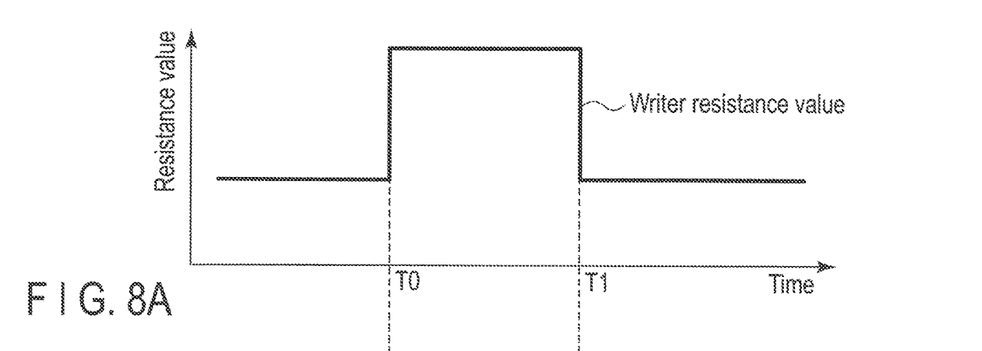
FIGS. 8A, 8B and 8C are diagrams showing the relationship between a writer resistance value of the conductive member, a calorific value in the vicinity of the write gap WG under constant voltage control, and a recording coil current, in the read operation (non-recording state) and in the write operation (recording state).
Figure 8B:
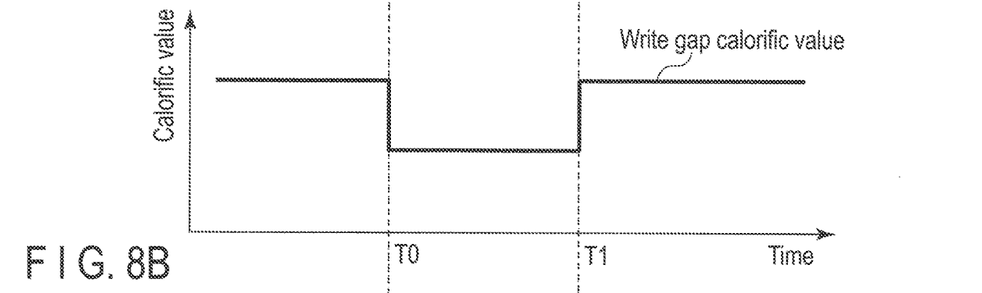
Figure 8C:
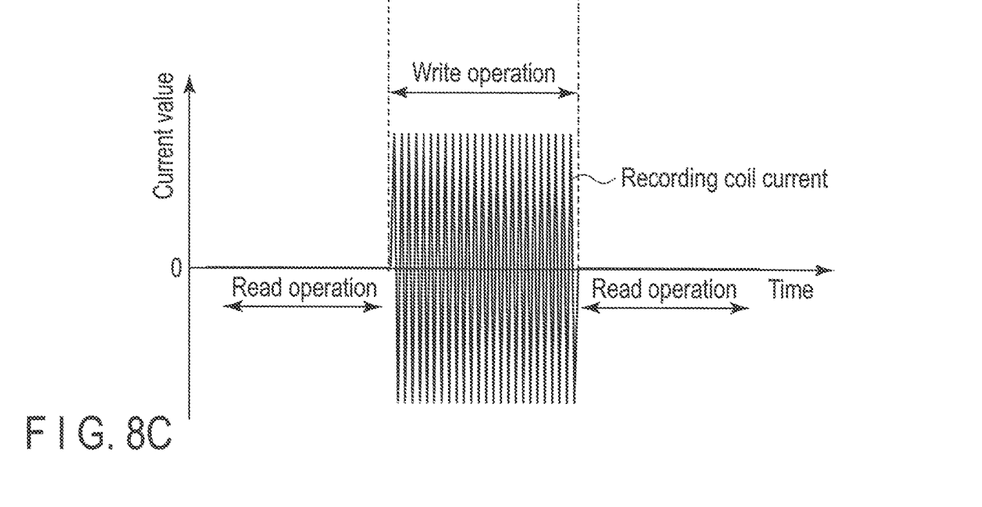

FIGS. 8A, 8B and 8C show the relationship between the writer resistance value of the conductive member 65, a calorific value in the vicinity of the write gap WG under constant voltage control, and the recording coil current, in the read operation (non-recording state) and in the write operation (recording state). As described above, the write resistance is relatively low in the read operation where the recording operation is not performed. Therefore, the calorific value of the write gap WG under the constant voltage control is relatively high, and the element projection in the vicinity of the write gap WG is large. On the other hand, the write resistance value is increased in the write operation by the magnetoresistive effect as described above. As a result, the calorific value of the write gap WG under the constant voltage control is reduced as compared to that of the read operation, and the vicinity of the write gap WG is relatively recessed from the ABS. In general, when the operation shifts from the read operation to the write operation, the vicinity of the write gap WG and the medium are more likely to contact each other by the influence of heat generation by the recording coil current itself, but according to the structure of the present embodiment, the element can be recessed appropriately in the write operation, and the danger of the element contacting the medium can be prevented.

Figure 9A:
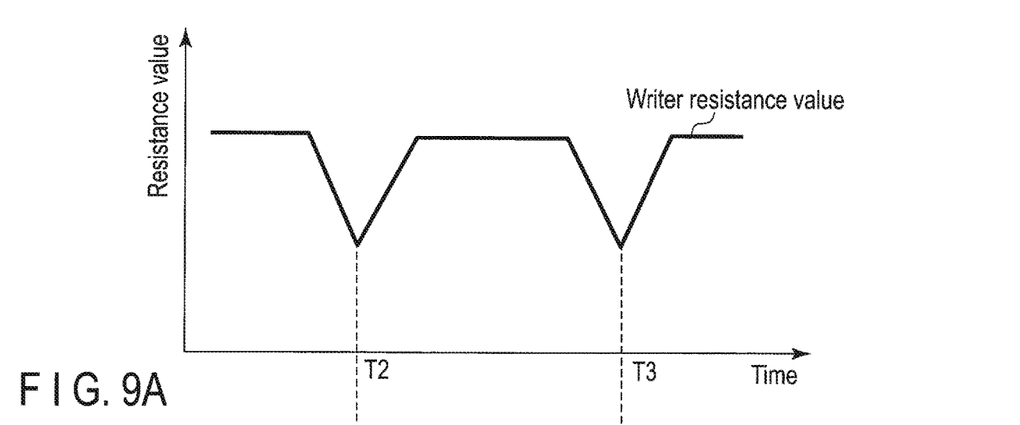
FIGS. 9A, 9B and 9C are diagrams showing the relationship between the writer resistance value, the calorific value of the write gap WG under the constant voltage control, and a change of the recording coil current over time, if a conductive member is formed of two or more films and when the recording coil current is changed in the write operation.
Figure 9B:
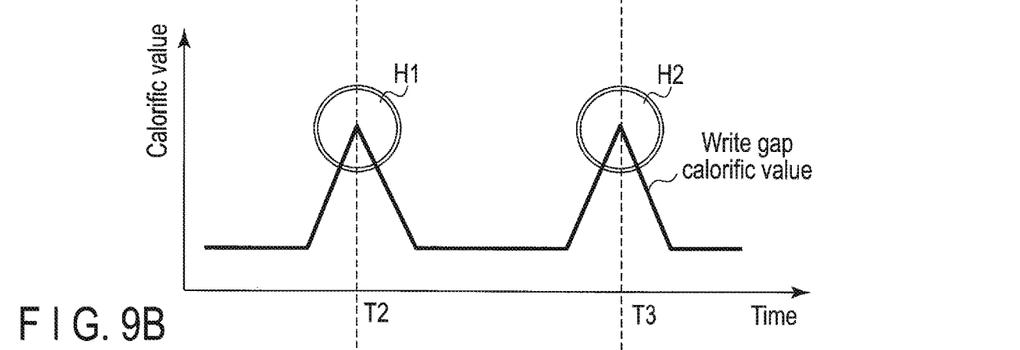
Figure 9C:
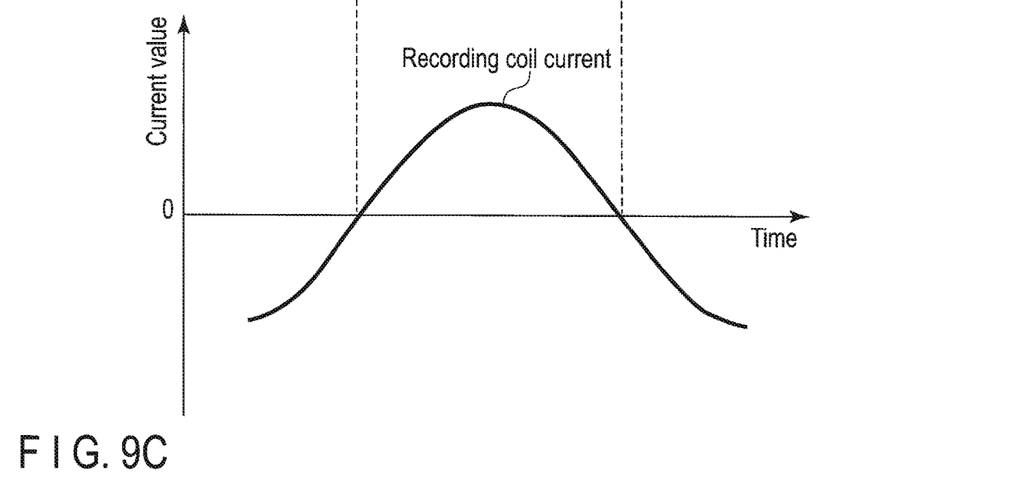

To completely solve the reliability problem, it is also necessary to consider the element projection in the write operation on a small scale of time. For this reason, the conductive member 65 should preferably be formed of one film. FIGS. 9A, 9B and 9C show the relationship between the writer resistance value, the calorific value of the write gap WG under the constant voltage control, and a change of the recording coil current over time, if the conductive member 65 is formed of two or more films and when the recording coil current is changed in the write operation. If the conductive member 65 is formed of multiple films, when the magnetization changes of the films are looked on a small scale of time, small phase differences are caused between the films particularly at timings (T2, T3) when the polarity of the recording coil current is inverted, and the writer resistance value decreases in the write operation. As a result, heat is generated in the write gap WG in particular times (H1 and H2 shown in FIG. 9B), and therefore even if the element projection appears to be corrected on a large scale of time, the element is actually in danger of contacting the medium in the write operation, and the reliability problem remains unsolved. On the other hand, if the conductive member 65 is formed of one film, phase differences between films are not caused, and a magnetoresistive effect is produced. Therefore, the writer resistance value can be maintained at high level in the read operation and the heat generation in the write gap WG in particular times can be prevented.

Figure 10A:
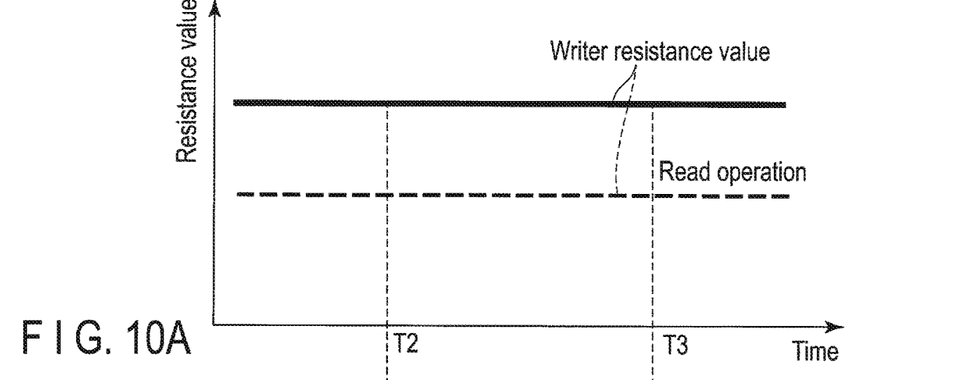
FIGS. 10A, 10B and 10C are diagrams showing the relationship between the writer resistance value, the calorific value of the write gap WG under the constant voltage control, and the change of the recording coil current over time, if the conductive member is formed of one film and when the recording coil current is changed in the read operation.
Figure 10B:
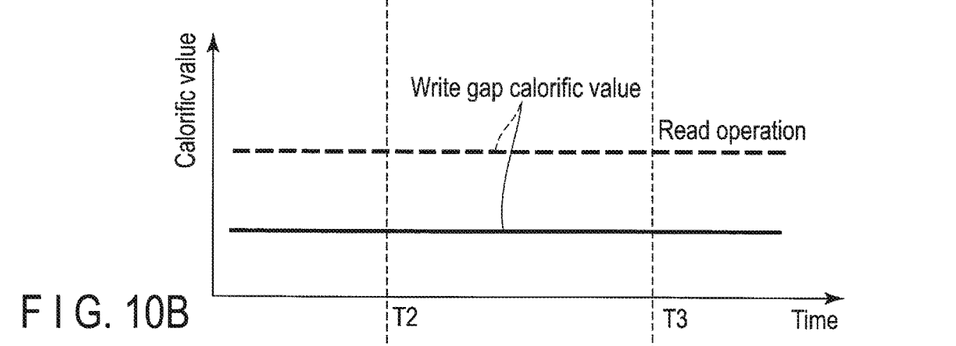
Figure 10C:
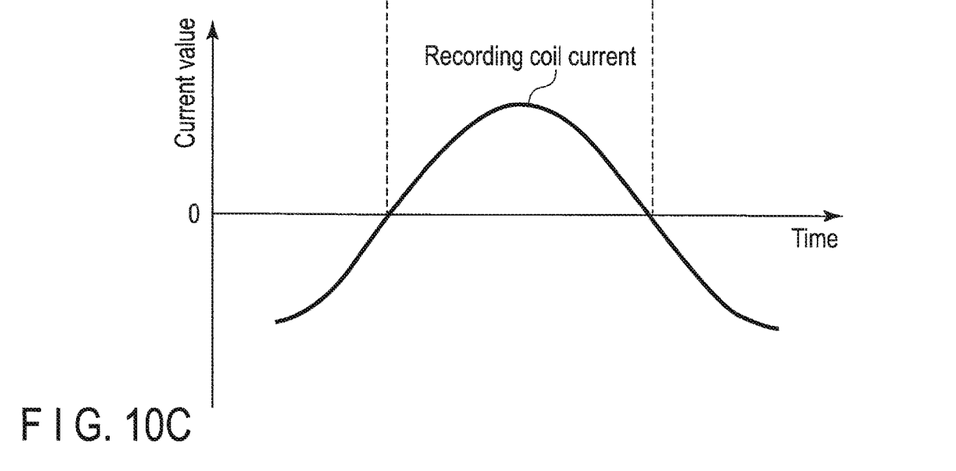

If the conductive member 65 is formed of one film, when the recording current is changed in the read operation, the writer resistance value, the write gap calorific value under the constant voltage control and the change of the recording coil current over time are shown in FIGS. 10A, 10B and 10C, and even if the polarity of the recording coil current is inverted, the writer resistance value will not change, and the heat generation in the write gap WG in particular times will not occur. As a result, the element will not project, and the element will be prevented from contacting the medium.

Figure 11A:
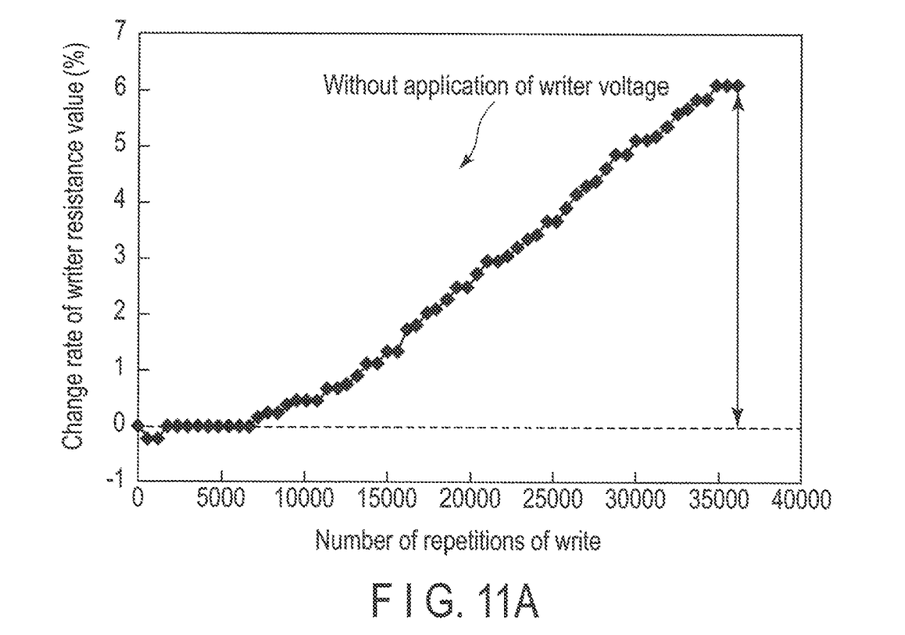
FIGS. 11A and 11B are diagrams respectively showing change rates of the writer resistance value without and with application of a writer voltage, when the write operation is repeated.
Figure 11B:
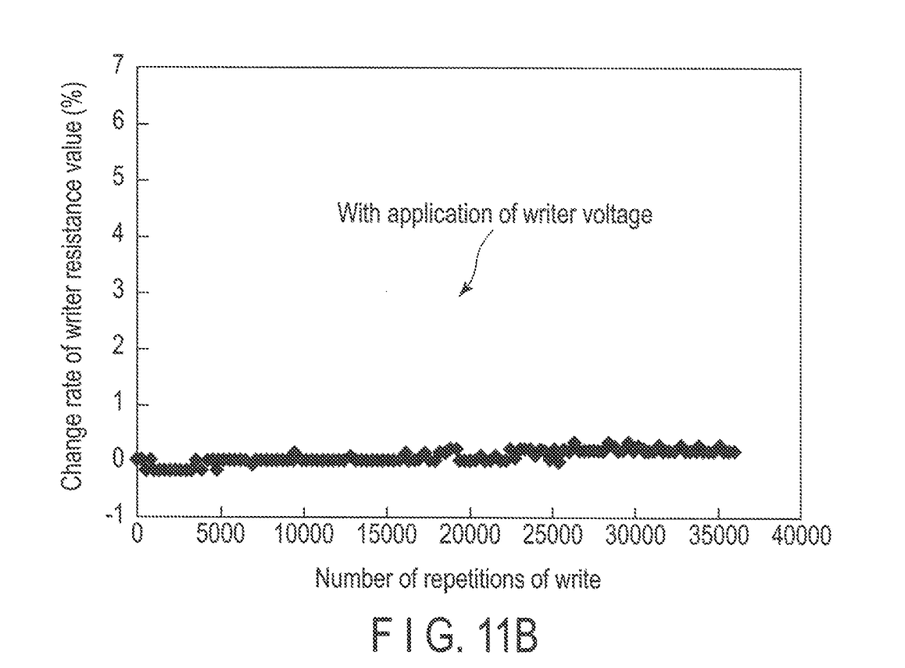

Next, an effect of the application of the present embodiment will be described. FIGS. 11A and 11B show a change rate of the writer resistance value without application of the constant voltage (writer voltage) in the write operation and a change rate of the writer resistance value with application of the constant voltage (writer voltage) in the write operation, respectively, when the write operation is repeated. FIG. 11A shows a case where the writer voltage is not applied, and FIG. 11B shows a case where the writer voltage is applied. If the writer voltage is not applied, since the element projection is not completely corrected, as the write operation is repeated to some extent, the writer resistance value gradually increases, accordingly, and because of the contact with the recording medium, the element in the write gap WG starts to deteriorate as shown in FIG. 11A. On the other hand, if the writer voltage is applied, the change of the writer resistance value at a time when the write operation is repeated is significantly suppressed, and the reliability is significantly improved as shown in FIG. 11B.

Figure 12:
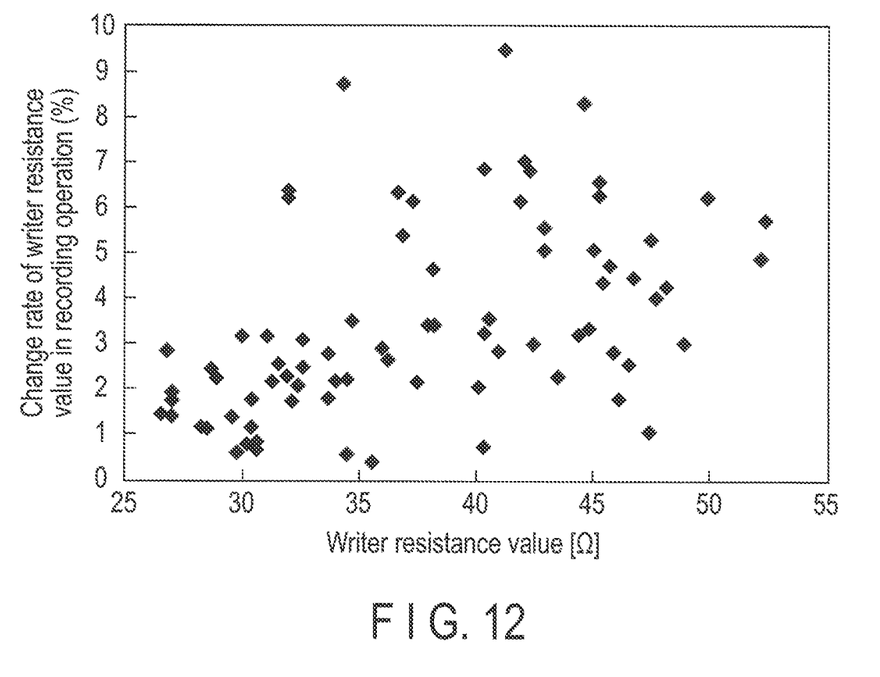
FIG. 12 is a distribution characteristics diagram showing the change rate of the writer resistance value when the polarity of a current applied through the main magnetic pole, the conductive member and the return magnetic pole is inverted in the write operation.

Here, the local heat generation in the vicinity of the write gap tends to occur when the polarity of the recording coil current is inverted. Therefore, to prevent the local heat generation in the vicinity of the write gap, the frequency component for the resistance change of the writer resistance value with respect to the AC current applied to the recording coil should preferably be twice the minimum data frequency component of the device (40 MHz or less). Further, in the write operation, the change rate of the writer resistance value at a time when the polarity of the current applied through the main magnetic pole, the conductive member and the return magnetic pole is inverted has distribution characteristics shown in FIG. 12. Therefore, if a range in which the maximum magnetoresistive effect can be produced is derived from the characteristics of the material used for the conductive member 65, the absolute value of the change rate of the writer resistance value should preferably be 0.1% or more and 10% or less.

As described above, in the magnetic disk device according to the present embodiment, the writer resistance value of the conductive member 65 varies between the recording state and the non-recording state, and therefore a constant voltage is applied to the current circuit formed of the main magnetic pole 60, the conductive member 65 and the return magnetic pole 63, and based on the change of the writer resistance value, the element projection in the vicinity of the write gap WG in the write operation can be locally controlled.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk having a recording layer conforming to perpendicular magnetic recording;
    a recording head which generates a perpendicular recording magnetic field to be applied to the recording layer; and
    a controller which controls a recording operation and a non-recording operation of the recording head, wherein
    the recording head includes:
    a main magnetic pole which generates the perpendicular recording magnetic field;
    a return magnetic pole which returns a magnetic flux from the main magnetic pole and forms a magnetic circuit in cooperation with the main magnetic pole;
    a recording coil which excites the magnetic flux in the magnetic circuit formed of the main magnetic pole and the return magnetic pole; and
    a conductive member in which end surfaces are connected to opposed surfaces of a write gap which is opposed to a distal portion of the main magnetic pole and a distal portion of the return magnetic pole, and a resistance value varies between the recording operation and the non-recording operation, and
    the controller includes:
    a constant voltage supply source which applies a current at a constant voltage to the magnetic circuit formed in the main magnetic pole and the return magnetic pole via the conductive member; and
    a current supply source which applies a current to the recording coil to excite the magnetic flux in the recording operation, wherein
    an absolute value of a change rate of the resistance value of the conductive member when a polarity of a current applied to a path of the main magnetic pole, the conductive member and the return magnetic pole is inverted in the recording operation is set to 0.1% or more and 10% or less.

2. The magnetic disk device of claim 1, wherein
    the conductive member is characterized with respect to a recording coil current applied to the recording coil in that a frequency component which changes the resistance value is less than or equal to twice a frequency component of the recording coil current.

3. The magnetic disk device of claim 1, wherein
    the conductive member is formed of at least one magnetoresistive effect film.

4. The magnetic disk device of claim 1, wherein
    the recording head includes terminals connected to the main magnetic pole and the return magnetic pole, and the constant voltage supply source applies the constant voltage to the terminals.

5. A recording head control method of a magnetic disk device comprising a recording head which generates a perpendicular recording magnetic field to a magnetic disk conforming to perpendicular magnetic recording,
    the recording head comprising:
    a main magnetic pole which generates the perpendicular recording magnetic field;
    a return magnetic pole which returns a magnetic flux from the main magnetic pole and forms a magnetic circuit in cooperation with the main magnetic pole;
    a recording coil which excites the magnetic flux in the magnetic circuit formed of the main magnetic pole and the return magnetic pole; and
    a conductive member in which end surfaces are connected to opposed surfaces of a write gap which is opposed to a distal portion of the main magnetic pole and a distal portion of the return magnetic pole, and a resistance value varies between a recording operation and a non-recording operation, the recording head control method comprising:

applying a current at a constant voltage to the magnetic circuit formed in the main magnetic pole and the return magnetic pole via the conductive member; and applying a current to the recording coil to excite the magnetic flux in the recording operation, and stopping applying the current to the recording coil in the non-recording operation, wherein an absolute value of a change rate of the resistance value of the conductive member when a polarity of a current applied to a path of the main magnetic pole, the conductive member and the return magnetic pole is inverted in the recording operation is set to 0.1% or more and 10% or less.

6. The recording head control method of claim 5, wherein the conductive member is characterized with respect to a recording coil current applied to the recording coil that a frequency component which changes the resistance value is less than or equal to twice a frequency component of the recording coil current.

7. The recording head control method of claim 5, wherein the conductive member is formed of at least one magnetoresistive effect film.

8. The recording head control method of claim 5, wherein the recording head includes terminals connected to the main magnetic pole and the return magnetic pole, and the constant voltage is applied to the terminals by a constant voltage supply source.

* * * * *